United States Patent [19]

Lane

[11] Patent Number: 4,481,458
[45] Date of Patent: Nov. 6, 1984

[54] MINERS LAMP POWER PACK

[75] Inventor: Kerry S. Lane, Newmarket, Canada

[73] Assignee: Levitt-Safety Limited, Toronto, Canada

[21] Appl. No.: 483,441

[22] Filed: Apr. 11, 1983

[51] Int. Cl.³ .............................................. H02J 7/00
[52] U.S. Cl. ......................................................... 320/2
[58] Field of Search ........................................ 320/2, 3

[56] References Cited

U.S. PATENT DOCUMENTS

| | | | |
|---|---|---|---|
| 1,800,918 | 4/1931 | Wheat | 320/2 |
| 2,813,265 | 11/1957 | Finks | 320/2 |
| 4,147,969 | 4/1979 | Miller et al. | 320/2 |
| 4,227,140 | 10/1980 | Nardella et al. | 320/2 |

Primary Examiner—J. D. Miller
Assistant Examiner—Anita M. Ault
Attorney, Agent, or Firm—Sim & McBurney

[57] ABSTRACT

A lamp rechargeable dry cell power pack and recharging device therefor is disclosed. The recharging device comprises a socket for receiving the power pack, a plurality of electrodes are presented in the socket and arranged to contact corresponding electrodes on the power pack when it is fully inserted in the socket. The power pack is irregular shaped in cross-section and the socket is correspondingly shaped to receive and support the power pack in only one orientation of the power pack relative to the socket to ensure the registration of the plurality of socket electrodes with corresponding power pack electrodes.

23 Claims, 7 Drawing Figures

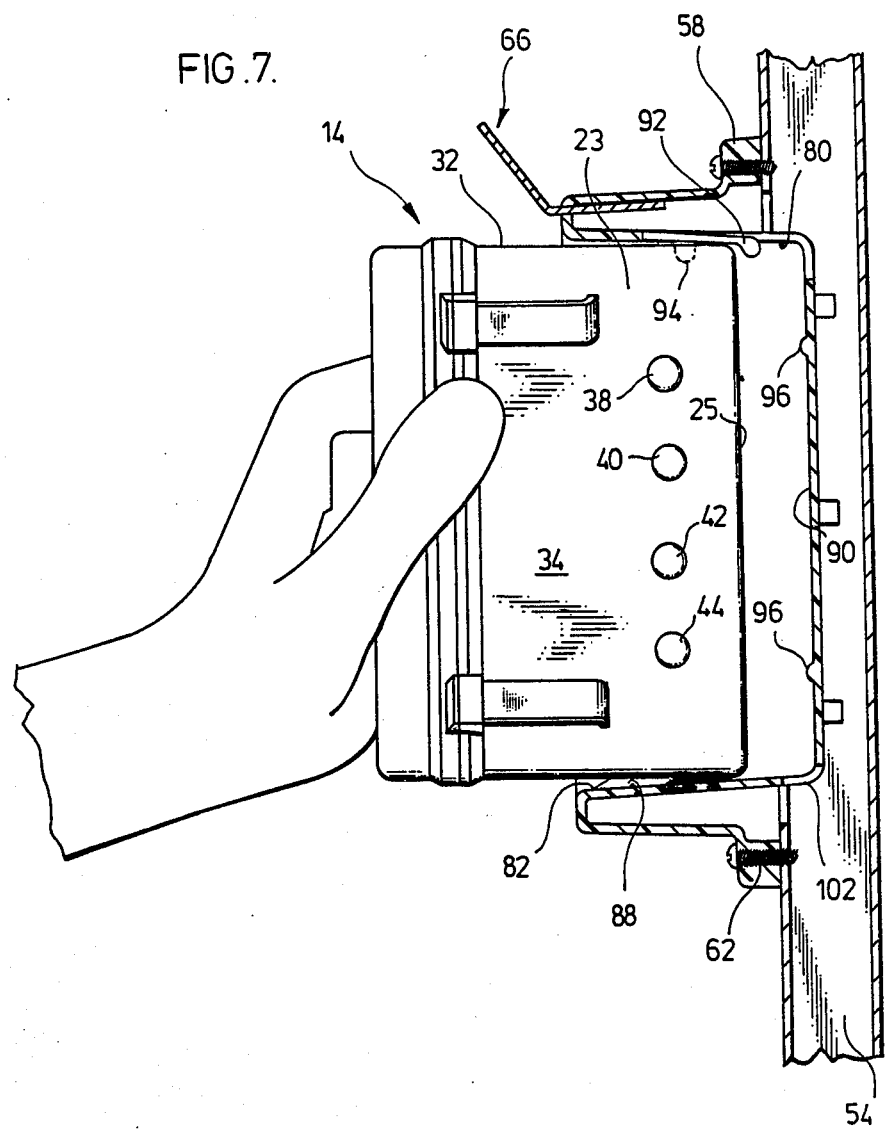

MINERS LAMP POWER PACK

FIELD OF THE INVENTION

This invention relates to a lamp having rechargeable cell power pack and electrical recharging device for the power pack.

BACKGROUND OF THE INVENTION

It is common to use lamps with rechargeable power packs because of their dependability and low maintenance cost. Such lamps have many industrial applications, such as in underground work in mines, tunnels and the like. Quite often the lamp is secured to the helmet of the user and the power pack is secured to the user's waist. Electrical wiring delivers power from the power pack to the lamp on the helmet. Normally at the end of each working shift, the lamp and power pack are removed and placed in a recharging device, so that the power pack is ready for reuse at the next working shift.

An example of this type of lamp is disclosed in U.S. Pat. No. 2,312,614. The power pack includes a plurality of batteries which are rechargeable. Electrical wiring connects a lamp which is securable to the worker's helmet to the batteries. The batteries are normally the wet cell, lead acid storage battery type which include appropriate venting devices to prevent electrolyte spillage. However, some electrolyte leakage can occur where the leaked acid damages the user's clothes and skin.

The power pack is charged by either using the lamp, which has appropriate electrodes for connection to a charging circuit, or connecting the battery to a charging circuit. In this U.S. patent, examples of both techniques are disclosed. In recharging the battery, it is important that it be positioned upright to provide proper venting of the battery during charging and to preclude electrolyte spillage. Recharging of the battery by use of the lamp is also disclosed in U.S. Pat. No. 2,066,811. Electrodes are positioned at the base of the lamp which are to a recharging circuit. By appropriately adjusting the control switch, the battery may be recharged during non-use. However, such arrangement requires the user to properly adjust the switch at the end of the shift and insert the lamp in the recharging device.

Insofar as recharging the battery where electrodes are positioned on the battery, an example is disclosed in U.S. Pat. No. 4,207,660. In this arrangement, several electrodes are positioned on the battery where at least two of the electrodes will form electrical contact with the recharging circuit to recharge the battery. Another example of external electrodes on the battery for purposes of recharging is in U.S. Pat. No. 4,317,162. The battery construction has the common lead acid arrangement with positive and negative charging terminals on the battery exterior. Because of the use of lead acid storage batteries, the unit must be retained in the upright position for purposes of recharging to prevent electrolyte spillage.

The use of nickel-cadmium batteries have become very popular because they are dry cell, hold their charge, have good discharge characteristics and are readily rechargeable. However, in the lamp field particularly for use in mining and the like, nickel-cadmium batteries are not that extensively used. Instead the lead acid form of batteries is by far the most popular.

SUMMARY OF THE INVENTION

The lamp and power pack therefor, according to this invention, provide a dry cell power pack for the lamp which is easy to operate and is easy to recharge when used with the recharging device of this invention. The combination, according to an aspect of the invention, has a recharging device comprising a socket for receiving at least a lower portion of the lamp power pack. A plurality of electrodes are presented in the socket and so arranged to contact corresponding electrodes on the power pack when fully inserted in the socket. The power pack is irregular shaped in cross-section, with the socket being correspondingly shaped to receive and support the power pack. In only one orientation of the power pack relative to the socket to ensure that the plurality of socket electrodes contact the corresponding power pack electrodes for purposes of recharging.

The recharging device includes controlling circuitry which actuates the recharging of the power pack once inserted into the socket. Because of the one way registration of the power pack with the socket, recharging of the power pack is assured. The electrodes on the power pack may be arranged so as to be against the user's hip and protect them from dirt and other debris in the working environment. Thus when the power pack is pushed into the socket, the electrodes slidingly engage one another to provide sound electrical contact for recharging the power pack.

BRIEF DESCRIPTION OF THE DRAWINGS

Preferred embodiments of the invention are shown in the drawings wherein:

FIG. 7 is a section through the recharging device demonstrating the insertion of the power pack into the socket of the recharging device.

DETAILED DESCRIPTION OF THE PREFERRED EMBODIMENTS

Figure 1:
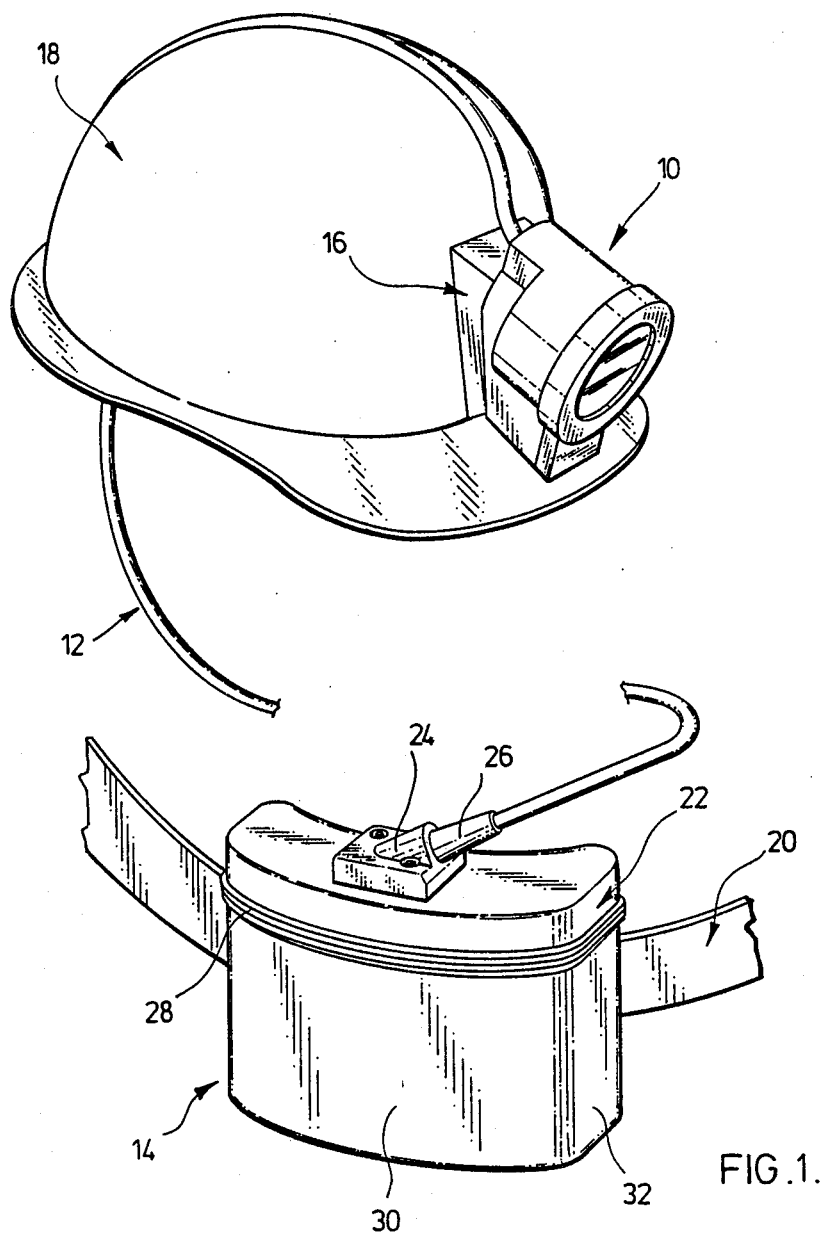
FIG. 1 is perspective view showing the lamp with accompanying power pack therefor.

The lamp and power pack, according to this invention, can be used in many ways as already exemplified. It is appreciated that the lamp may be directly connected to the power pack, such as a handheld lamp arrangement or the lamp may be remote from the power pack and electrically connected thereto by wiring to permit positioning of the lamp, for example, on the user's headgear and securement of the power pack to the user's waist. This last embodiment is demonstrated in FIG. 1 where a lamp 10 is electrically connected by wiring 12 to its power pack 14. The lamp is releasably connected by way of an attachment arrangement generally designated 16 on the user's helmet or hardhat 18. The power pack 14 is secured to the user's waist by way of a belt 20. The electrical wiring 12 is secured to the upper portion 22 of the power pack 14 by a water tight angled connector 24 which has a bushing 26 to anchor the wiring 12 into the connector 24. Recessed bolts having slightly oval heads 25, as shown in FIG. 2, are used to secure the connector to the upper portion 22. A special tool is required to loosen the bolts to prevent the user from opening the power packs and possibly damaging the dry cells. The wiring 12 is of sufficient length so as to comfortably permit location of the lamp 10 on the hardhat 18 and allow the user, such as a miner, to freely move about.

The upper portion 22 of the power pack is hermetically sealed at 28 to the remainder of the casing of the power pack to ensure waterproof containment of dry cells within the power pack. There may be several dry cells located within the casing of the power pack, such as five circular cells which are electrically interconnected to provide power by way of the electrical wiring 12 to the lamp 10.

Figure 2:
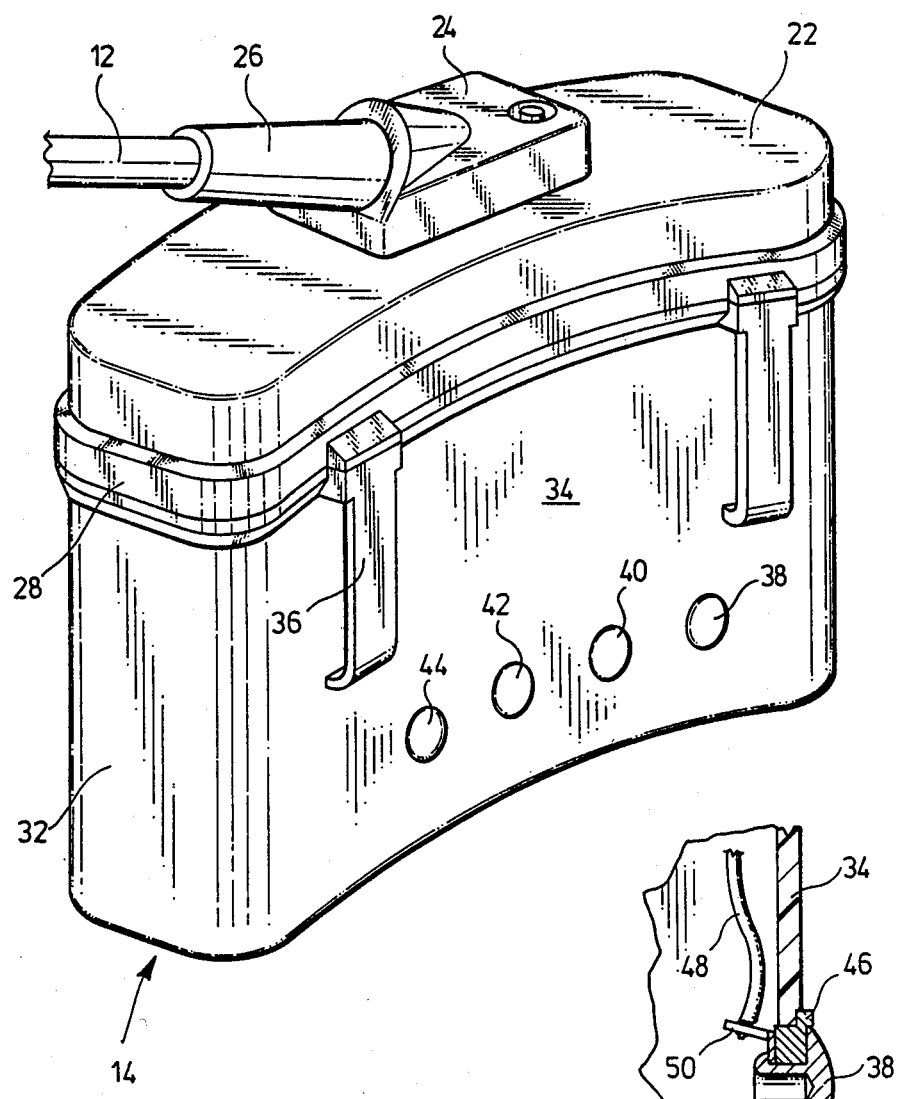
FIG. 2 is a perspective view of the inner surface of the power pack of FIG. 1.

As can be appreciated from FIG. 1, the power pack has an outer face 30, opposing sidewalls 32 and a rear wall 34 as shown in FIG. 2. Located on the rear wall are integrally cast belt loop portions 36 through which the belt 20 passes for purposes of mounting the power pack 14 on the user's hip. The power pack is crescent or curved shaped so that the interior surface 34 approximates the shape of the user's hip to provide comfort in use and a reasonably contiguous location of the inner surface 34 of the power pack against the user's hip. Such contiguous location protects and keeps reasonably clean the recharging electrodes 38, 40, 42 and 44 located on the rear surface 34 of the power pack. During use of the power pack and lamp, because the inner surface 34 is curved debris in the work environment is shielded from the electrodes on the rear of the power pack and by constant rubbing of the electrodes against the user's clothing, the contacts are kept reasonably clean.

Figure 3:
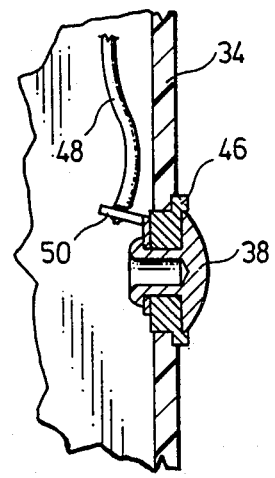
FIG. 3 is a section through the power pack showing a detail of one of the recharging contact electrodes.

FIG. 3 shows the shape of the electrical contact 38 as it protrudes slightly beyond the rear surface 34. The metal electrical contact 38 is hermetically sealed by sealing ring 46 to the rear wall panel 34. Internally of the power pack 14, an electrical wire 48 is connected to terminal 50 of the electrode 38 to deliver power applied to electrode 38 in recharging the batteries within the power pack.

The dry cell power packs are preferably the rechargeable nickel-cadmium type batteries which have superior discharge characteristics. It is appreciated, however, that other forms of dry cell rechargeable battery arrangements may be used. The advantage in using dry cells is that the power pack may be oriented in any direction without concern of electrolyte spillage nor venting of the battery. In addition, the dry cell arrangement also permits the curving of the power pack to comfortably fit the user's hip and as a result, the power pack takes on in cross-section an irregular shape. Advantage can then be taken of the irregular shape for purposes of inserting the power pack in a socket of a recharging device. Such irregular shape, with an appropriately shaped socket, will only receive the power pack in one orientation so that matching of the recharging electrodes can be accomplished for purposes of recharging the power pack.

Figure 4:
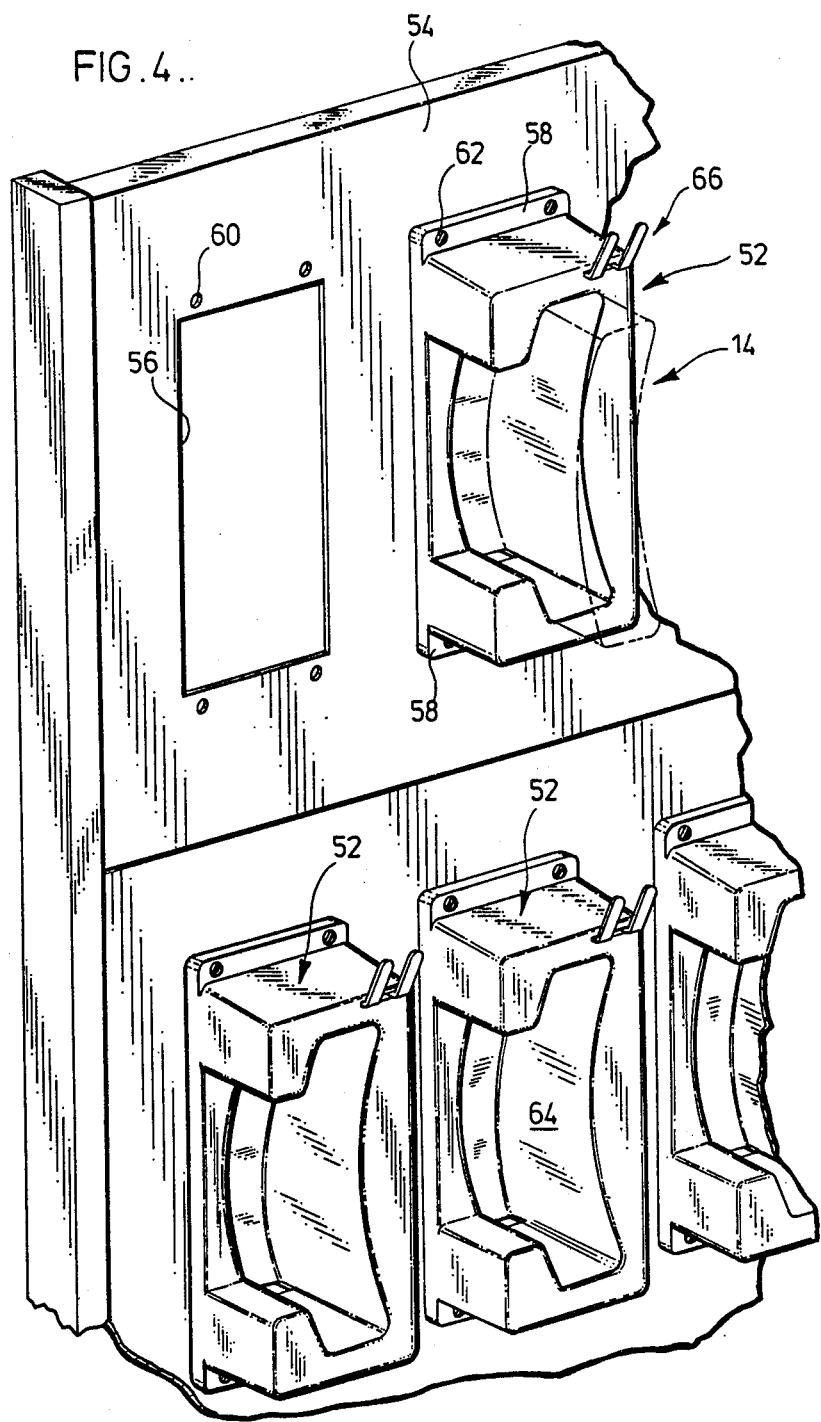
FIG. 4 is a perspective view of several recharging devices for recharging a plurality of the power packs of FIG. 2.

Referring to FIG. 4, several recharging devices 52 are mounted on a vertical wall panel 54. The wall panel includes a plurality of cutouts 56 which receive the base portion of each recharging device 52. Flanges 58 are provided on the top and bottom of each recharging device 52. Apertures 60 are drilled in the wall panels so that self-tapping screws 62 secure the flanges 58 to the vertical panels and, in turn, provide an array of recharging devices. As shown in shadowed line, the power pack 14 is inserted in the socket area 64 of the recharging device 52 for purposes of recharging. A hook arrangement 66 is provided on which the lamp to the power pack 14 may be positioned while the battery is recharging. Thus at the end of a shift or the end of a work project, the user may remove the power pack and lamp, simply push the power pack into the recharging device, hang the lamp on hook arrangement 66 without any further need to adjust switches or the like to ensure recharging of the power pack 14.

Figure 5:
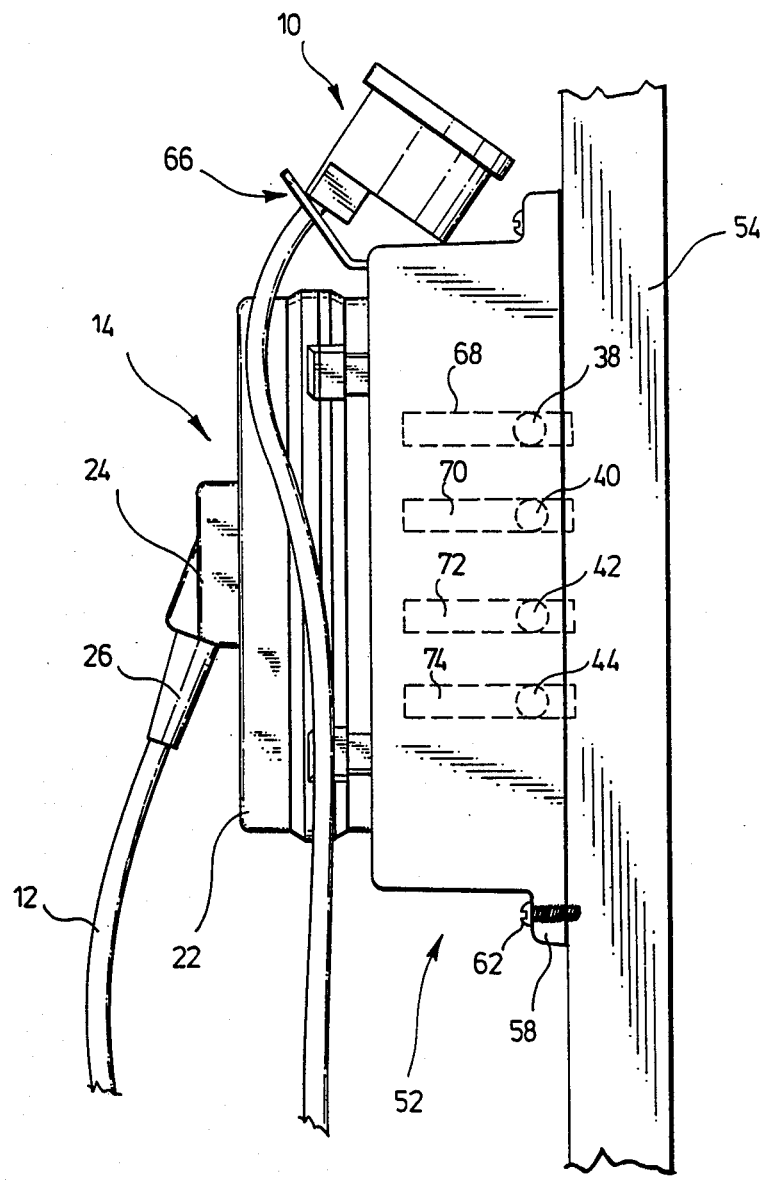
FIG. 5 is a side elevation of a power pack inserted in the socket of a recharging device.

Referring to FIG. 5, a side elevation of the recharging array is shown. The power pack 14 is pushed into the recharging device 52 where the lamp 10 is placed on hook 66 with the electrical cord 12 extending in a looped manner from the recharging device 12 to the lamp 10. The electrodes in the recharging device are shown in dot at 68, 70, 72 and 74 to correspond with electrodes 38, 40, 42 and 44 on the rear surface of the power pack. To facilitate insertion of the power pack into the recharging device, the orderly location of the cord connecting the lamp to power pack is achieved by orienting the sockets to extend vertically, as shown in FIG. 4. The wiring connector 24 with its bushing 26 is oriented on the top 22 of the power pack so that the electrical wiring 12 extends downwardly from the power pack to form the loop in the wiring with the lamp 10 on the hook 66. Thus with the vertical orientation of the power pack, the wiring is looped in an orderly fashion for each power pack along the array of recharging devices.

Because of the use of the dry cells resulting in the curved shape for the power packs, then appropriately shaping the socket 64 to only receive the power pack in the single orientation facilitates manipulation of the unit by the user to readily ensure recharging of the device. Electronic circuitry well understood in the art is located within each recharging device 52 or at a central control panel where the electrodes 68, 70, 72 and 74 are connected to such circuitry to sense when a power pack is inserted in the recharging socket to determine the charge on the battery and actuate recharging power on the electrodes 68 through 74 to properly recharge the battery at an acceptable rate. A thermocouple may be located in the battery to determine its interior temperature relative to the ambient temperature and cutoff the recharging should the battery begin to overheat. All such techniques are well understood in the art and are not described in detail here.

Figure 6:
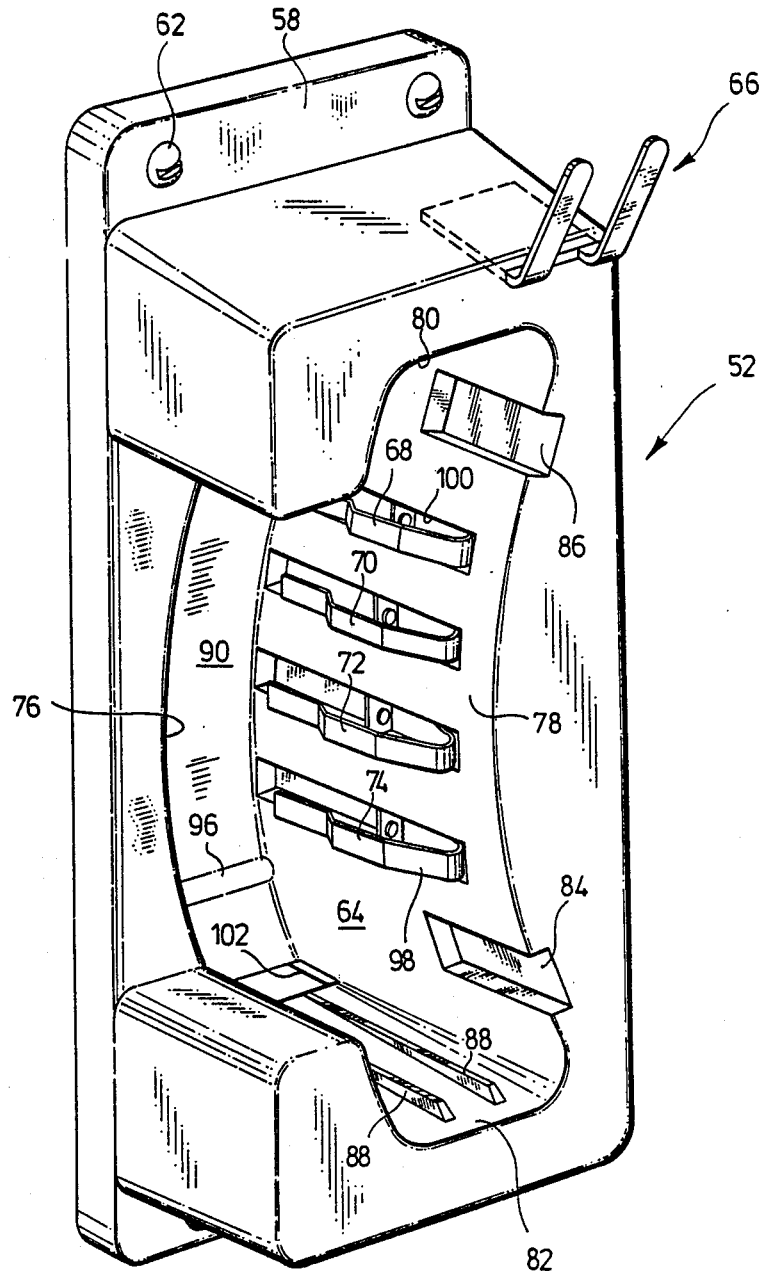
FIG. 6 is a perspective view of the interior of the socket of a recharging device.

The recharging device 52 is shown in more detail in FIG. 6. The socket 64 in the recharging device 52 is defined by a curved front wall 76, opposing rear wall 78 and opposing top and bottom walls 80 and 82. Provided in the curved rear wall 78 are two recesses 84 which are of sufficient width and depth to receive the belt loop portions 36 on the rear face 34 of the power pack. The curvature, width, height and depth dimensions of the socket 64 are such to only receive the power pack in one orientation and to snugly receive the power pack in the manner shown in FIG. 7. The bottom wall 82 includes ramp portions 88 which guide the insertion of the power pack 14 into the socket 64. The lower portion 23 of the power pack is guided by the curvature of the socket 64 towards the base 90 of the socket. The upper wall 80 of the socket includes a spring detent 92 which is sprung upwardly by the sidewall 32 of the power pack during insertion into the socket. A dimple 94, shown in dot in the sidewall 32 of the power pack, mates with the spring detent 92 when the bottom 25 of a power pack contacts raised ridges 96 on the base 90 of the recharging sockets. This provides a snap action clipping of the power pack in the socket to first of all give an audible signal that the power pack is in position for recharging, and secondly to retain the power pack in the recharging socket, so as to avoid the power pack falling out of the socket as a result of any vibrations or the like from the industrial surroundings. Thus with the power pack inserted into the socket approximately half way, the electrodes 38, 40, 42 and 44 of the power pack have contacted and have slid along corresponding electrodes 68, 70, 72 and 74 of the recharging socket. The upper portion of the power pack is exposed to permit grasping thereof as shown in FIG. 7 to facilitate removal.

As mentioned, appropriate electronic circuitry may be located in the cavity of the recharging device 52 located behind the rear wall 78 for sensing when a power pack is positioned within the socket and for controlling the recharging of the dry cell power pack. The recharging circuit includes an additional thermocouple to sense ambient temperature in addition to battery temperature during recharging. The thermocouple for sensing ambient temperature is located in the recharger and covered so as to attenuate any effect of periodic cold drafts or other sudden temperature changes. In this way, the recharging control circuitry does not erroneously change the charging rate on the power pack. Each of the electrodes 68 through 74 include ramp portions 98 which initially contact the electrodes 38 through 44 in depressing the spring loaded electrodes 68 through 74 into the corresponding recess areas 100 of the rear wall 78. This camming action on the spring loaded electrodes 68 through 74 provides a wiping contact so as to abraid and remove debris on the electrodes to ensure a good electrical contact between each corresponding set of recharging electrodes. Because the circuitry has the ability to sense when a power pack is in the recharging socket, there is no need to turn on switches or adjust switches or the like to effect recharging. Thus this device enables the user to simply push the power pack into the recharging unit and know that the power pack is being properly recharged. As a backup to visually indicate status of the recharger and the power supply, lights may be provided on the recharger. Such lights may, for example, indicate that the recharger is working and proper electrode contact has been made and indicate when the power pack is back up to full charge.

It is appreciated that in many instances the power pack could be covered with some debris and dirt, so that upon several uses in the recharging device, dirt may collect on the lower wall 82 of the recharging socket. To compensate for this, an opening 102 is provided in the lower wall 82 of the recharging socket. Such opening permits the clearing of any debris which may collect on the lower wall, so that as the power pack is pushed into the socket, the debris is pushed ahead of the lower region 23 of the power pack and cleared out through opening 102. Opening 102 is located relative to the wall panel 54 so that all debris is cleared down the rear of the wall and away from the frontal operative area of the recharging devices.

From the construction of both the battery pack casing and the recharging device, it is apparent that these units may be molded from plastics material. The selection of the plastics is such that it is not degradable by way of corrosive ambient conditions, is impact and abrasion resistant and is waterproof. It is appreciated that many plastics fit this category, although the most suitable plastic is ABS (acrylonitrile-butadiene-styrene) optionally mixed with a polycarbonate. Another advantage in individually forming the recharging devices is that, should a device become faulty or fail, it may be readily removed from the vertical panel and another unit replaced therefor. By making it out of a plastic injection moldable material, the curved shaped for the unit along with the ramp portion, the catch detent and other recesses and the like are readily formed in the molded product.

Thus the recharging device, according to this invention, for a lamp power pack provides a straight push in of the power pack to actuate the charging cycle. There is no need to effect changing of a switch or commit the lamp to a particular use during the recharging. This allows repair of the lamp without interrupting the recharging cycle of the dry cell battery. The contacts are positioned on both the power pack and the recharging unit so as to be remote and out of the way to avoid damage and fouling with debris in the work environment. The curvature of the unit results in a unidirectional insertion of the power pack into the recharging device to always assure the recharging cycle and thus a more reliable unit.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. In combination, a rechargeable dry cell power pack with a lamp and recharging device for said dry cell power packs, said recharging device comprising a socket for receiving at least a lower portion of said power pack, a plurality of electrodes being presented in said socket and so arranged to contact corresponding electrodes on said power pack when fully inserted in said socket, said lamp being electrically connected to said power pack by a length of electrical wiring, means provided on said recharger device for holding said lamp accompanying said power pack while said power pack is in place in the socket of said recharger, said power pack being curved slightly to conform to a user's hip when in use, said power pack electrodes being positioned in an inner face portion of said power pack so as to be adjacent a user's hip when in use, said socket having a corresponding shape to receive at least said lower portion of said power pack, said socket having correspondingly curved opposing first and second faces, said socket electrodes being positioned on said first face so as to contact said power pack electrodes when said power pack is inserted into said socket, said socket receiving and supporting said power pack in only one orientation of said power pack relative to said socket to ensure that said plurality of socket electrodes contact said corresponding power pack electrodes.

2. In the combination of claim 1, said socket comprising means for releasably retaining said power pack therein during the recharging of said power pack.

3. In the combination of claim 1, said recharging device including means capable of delivering electrical power to said plurality of socket electrodes and means for controlling the flow of electrical power to control the rate at which and the extent to which said dry cell power pack is recharged.

4. In the combination of claim 1, said electrodes of said recharger being outwardly biased into said socket and being elongate to extend parallel to the axis of insertion into said socket, said electrodes of said recharger being brushed as they are displaced by the corresponding electrodes of said power pack during insertion of said power pack into said recharger to ensure an electrical contact between the electrodes of said recharger and the electrodes of said power pack.

5. In the combination of claim 1, the depth of said socket being horizontally directed when in use to permit insertion of said power pack lower portion into said socket in an horizontally directed manner.

6. In the combination of claim 5, means providing an opening in said socket to permit clearing debris from said socket while said power pack is pushed into said socket.

7. In the combination of claim 5, said recharging device having a plastic injection molded body portion with an external means for wall mounting of said recharging device, said socket being defined in said body portion where the socket is of a molded shape to receive said irregular shaped power pack.

8. In the combination of claim 7, said power pack having an outer casing formed of an injection molded plastic and having a curved shape to fit the contour of a user's hip when in use, said socket of said recharger device having a corresponding shape to provide a single orientation of said power pack for registration with and insertion into said socket.

9. In the combination of claim 8, said recharging device body portion and said power pack casing being formed from a plastic material which includes acrylonitrile-butidiene-styrene.

10. In the combination of claim 8 or 9, an opening being provided in the lowermost portion of the socket when in use to permit debris to be pushed out of said socket through said opening when said power pack is inserted into said socket.

11. In the combination of claim 9, means for releasably retaining said power pack in said socket being molded in said socket as defined in said body portion.

12. In the combination of claim 8 or 9, said power pack being inserted into said socket approximately half way to permit grasping of the upper portion of said power pack to facilitate insertion and removal.

13. In the combination of claim 1, 7 or 9, said power pack having rechargeable nickel-cadmium dry cell batteries.

14. In the combination of claim 7, a plurality of said recharging devices being mounted on a wall with the sockets in cross-section extending generally vertically.

15. In the combination of claim 1, said power pack electrodes being spaced apart and protruding from said inner face of said power pack.

16. In the combination of claim 15, said socket electrodes being spaced apart in a manner to contact said power pack electrodes, each of said socket electrodes being biased into said socket and moveable laterally by said power pack electrodes as said power pack is inserted into said socket.

17. In the combination of claim 16, said wall consisting of a panel having a plurality of openings, each opening permitting placement of a portion of the socket body portion through the opening, said recharging device being secured to said panel with said external means.

18. In the combination of claim 16, said socket electrodes having lead in portions to assist said power pack electrodes camming said socket electrodes laterally as said power pack is inserted into said socket.

19. In the combination of claim 18, said recharger having means for releasably retaining said power pack in said socket.

20. A recharging device for a lamp rechargeable dry cell power pack comprising a body portion having a cavity for receiving bottom first at least a lower portion of a lamp dry cell power pack which is irregular-shaped in cross-section, said cavity being shaped to receive and cooperate with the lower portion of a lamp power pack to support same, said body portion having means for mounting said recharging device on a wall panel in a manner that said cavity in cross-section extends generally in a vertical plane, said cavity having a plurality of electrodes so arranged to contact corresponding electrodes external of a lamp dry cell power pack when inserted in said cavity, said body portion is molded from a plastic material, said cavity being formed with an opening in its lowermost portion when mounted on a wall panel to permit pushing of debris out of said cavity through said opening when a lamp power pack is inserted into said cavity.

21. A recharging device of claim 20, wherein said body portion includes means for releasably retaining a lamp power pack in said cavity.

22. A recharging device of claim 20, wherein said cavity is crescent-shaped in cross-section to receive a correspondingly shaped lamp power pack, such shape providing for a single orientation of registry of a lamp power pack with cavity for insertion therein.

23. In combination, a rechargeable dry cell power pack with a lamp and recharging device for said dry cell power pack, said recharging device comprising a body portion having a socket for receiving bottom first at least a lower portion of said dry cell power pack which is irregular-shaped in cross-section, said socket being shaped to receive and cooperate with the lower portion of a lamp power pack to support same, said body portion having means for mounting said recharging device on a wall panel in a manner that said cavity in cross-section extends generally in a vertical plane, said cavity having a plurality of electrodes so arranged to contact corresponding electrodes external of said dry cell power pack when inserted in said socket, said body portion is molded from a plastic material, said socket being formed with an opening in its lowermost portion when mounted on a wall panel to permit pushing of debris out of said socket through said opening when said dry cell power pack is inserted into said socket, said socket receiving and supporting said dry cell power pack in only one orientation of said power pack relative to said socket to ensure that said plurality of socket electrodes contact said corresponding power pack electrodes.

* * * * *